United States Patent [19]

Reunamaki

[11] Patent Number: 5,088,920
[45] Date of Patent: Feb. 18, 1992

[54] DRIVE MECHANISM FOR GLASS SHEET ROLLER CONVEYOR OF FURNACE

[75] Inventor: Pauli T. Reunamaki, Tampere, Finland

[73] Assignee: Glasstech, Inc., Perrysburg, Ohio

[21] Appl. No.: 621,025

[22] Filed: Nov. 30, 1990

[51] Int. Cl.⁵ .............................................. F27B 9/28
[52] U.S. Cl. ...................................... 432/59; 432/236; 432/246
[58] Field of Search .................. 432/236, 243, 246, 59, 432/8; 414/41, 147

[56] References Cited

U.S. PATENT DOCUMENTS

| | | | |
|---|---|---|---|
| 3,810,735 | 5/1974 | Moser | 432/59 |
| 4,767,321 | 8/1988 | Chilva | 432/59 |
| 4,802,845 | 2/1989 | Kajiura | 432/246 |

Primary Examiner—Henry C. Yuen
Attorney, Agent, or Firm—Brooks & Kushman

[57] ABSTRACT

A drive mechanism (32) for a roller conveyor (28) of a furnace (12) for heating flat glass sheets includes a primary drive loop (34) received by primary drive wheels (36) and also includes a plurality of secondary drive loops (50) each of which is associated with a pair of conveyor rolls (30). Internal teeth (42) of the primary drive loop (34) and external teeth (52) of the secondary drive loops (50) are engaged to provide a driving relationship therebetween, while internal teeth (54) of the secondary drive loops (50) drive gears (56) secured to the conveyor rolls (30). A plurality of idler gears (64) mesh with the external teeth (54) of the secondary drive loops (50) to maintain tensioning that prevents backlash and provides uniform reversal of all conveyor rolls as the driving changes from one direction to the other as well as allowing the conveyor rolls to be positioned with their high sides aligned so as to maintain planarity during the conveyance. The primary drive loops (34) has a metal core (70) and an elastomeric covering (72) that forms its internal teeth (42). Engagement rollers (80) of the drive mechanism maintain engagement between inclined faces (42a,52a) of the internal teeth 42 of the primary drive loop (34) and the external teeth (52) of the secondary drive loops (50).

9 Claims, 3 Drawing Sheets

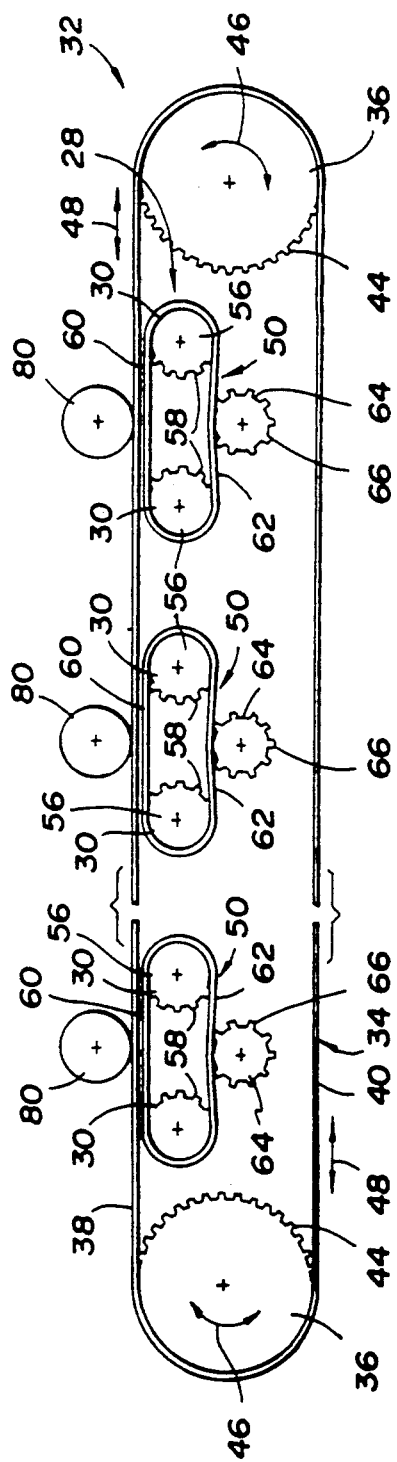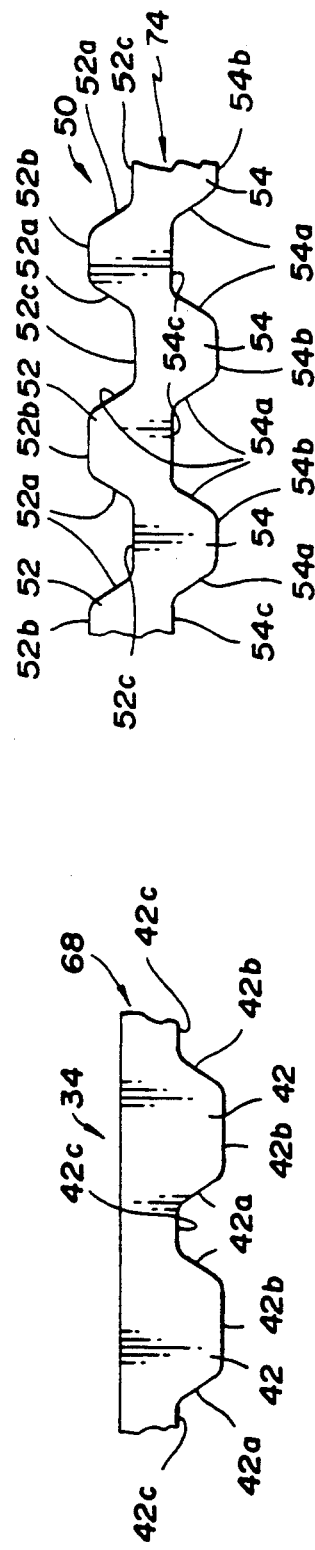

DRIVE MECHANISM FOR GLASS SHEET ROLLER CONVEYOR OF FURNACE

TECHNICAL FIELD

This invention relates to a drive mechanism for a roller conveyor of a furnace for heating flat glass sheets.

Furnaces for heating flat glass sheets have previously been constructed to provide oscillation of the glass sheet during the heating in order to reduce the length of the furnace as compared to furnaces wherein the heating takes place during conveyance in a single direction. When meshing teeth are utilized to provide the rotary driving of the roller conveyor, it has been found that backlash can occur upon the reversal of the direction of driving in a manner that can adversely affect the surface quality of the conveyed glass sheet when the heating has proceeded to a sufficient extent to soften the glass.

DISCLOSURE OF INVENTION

An object of the present invention is to provide an improved drive mechanism for a roller conveyor of a furnace for heating flat glass sheets for oscillation wherein the driving is provided by meshing teeth without any backlash, the driving by meshing teeth provides uniform reversal of the conveyor rolls as the driving changes from one direction to the other, and the driving by meshing teeth allows the conveyor rolls to be positioned with their high sides aligned so as to maintain planarity during the conveyance.

In carrying out the above object and other objects of the invention, a furnace for heating flat glass sheets in accordance with the present includes a housing defining a heating chamber and also includes a roller conveyor located within the housing and having horizontal rolls for conveying a flat glass sheet to be heated. A drive mechanism of the furnace includes a primary drive loop and a pair of primary drive wheels that receives the primary drive loop which extends therebetween with substantially straight driving and return reaches. The primary drive loop has internal teeth and the pair of primary drive wheels have external teeth that mesh with the internal teeth of the primary drive loop. The primary drive wheels alternately drive the primary drive loop in opposite directions. The drive mechanism also includes a plurality of secondary drive loops each of which has external and internal teeth and each of which is associated with a pair of conveyor rolls. Drive gears of the drive mechanism are each secured to an associated conveyor roll. Each drive gear includes external teeth that mesh with the internal teeth of the associated secondary drive loop which has driving and return reaches extending therebetween. The external teeth of each secondary drive loop along the driving reach thereof mesh with the internal teeth of the primary drive loop along the driving reach of the primary drive loop to drive the conveyor rolls in opposite directions as the primary drive loop is driven in opposite directions. A plurality of idler gears of the drive mechanism are respectively associated with the secondary drive loops and have external teeth that mesh with the external teeth along the return reaches of the secondary drive loops to maintain tensioning that prevents backlash and provides uniform reversal of all of the conveyor rolls as the driving changes from one direction to the other as well as allowing the conveyor rolls to be positioned with their high sides aligned so as to maintain planarity during the conveyance.

In the preferred construction, the primary drive loop is constructed as a belt having a metal core and an elastomeric covering that forms the internal teeth of the primary drive loop. As disclosed, each secondary drive loop is also constructed as a belt having a metal core and an elastomeric covering that forms the external and internal teeth of the secondary drive loop.

In the preferred furnace construction, the drive mechanism also has the teeth of the primary drive loop and the secondary drive loop constructed to include flat faces that are inclined as well as including top and bottom lands extending between the inclined faces. These teeth are also of sizes such that the top lands of the teeth of each drive loop are spaced from the bottom lands of the teeth of the other drive loop. A plurality of engagement rollers of the drive mechanism are respectively associated with the secondary drive loops to maintain the engagement between the inclined faces of the teeth of the primary and secondary drive loops during the driving in each direction and upon changing from each direction to the other direction without any backlash.

Preferably, the roller conveyor has its conveyor rolls made from fused silica so as to be resistant to thermal warpage. The conveyor rolls have opposite ends that project outwardly from the heating chamber through the furnace, and bearings rotatably support the opposite ends of the conveyor rolls outside the furnace. Furthermore, the drive mechanism drives the ends of the conveyor rolls on one side of the furnace with the adjacent bearings located between the furnace and the drive mechanism.

The drive mechanism can also be used to provide driving of a single direction roller conveyor of a furnace.

The objects, features and advantages of the present invention are readily apparent from the following detailed description of the best mode for carrying out the invention when taken in connection with the accompanying drawings.

BRIEF DESCRIPTION OF DRAWINGS

FIG. 3 is a schematic side elevational view illustrating the construction of the roller conveyor drive mechanism;

FIG. 4 is a partial view illustrating the construction of a primary drive loop of the drive mechanism;

FIG. 5 is a partial view illustrating the construction of secondary drive loops of the drive mechanism;

BEST MODE FOR CARRYING OUT THE INVENTION

Figure 1:
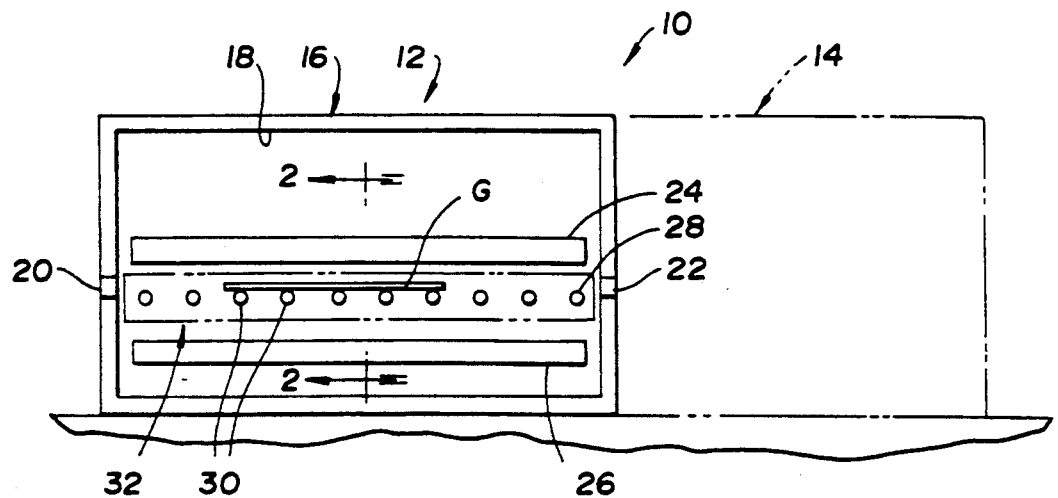
FIG. 1 is a schematic side elevational view of a glass sheet processing system including a roller conveyor and a drive mechanism constructed in accordance with the present invention.

With reference to FIG. 1 of the drawings, a system for processing flat glass sheets is indicated by 10 and includes a furnace 12 in which the glass sheets are heated as well as including a processing station 14 for processing the heated glass sheets such as by bending and tempering or other similar processing.

Furnace 12 shown in FIG. 1 is constructed in accordance with the present invention to heat the flat glass sheet G and includes a housing 16 that defines a heating chamber 18 in which the heating takes place. This housing 16 is illustrated as having an insulated construction and is shown with an entrance slot 20 through which the heated glass sheets are introduced into the heating chamber 18 as well as including an exit slot 22 through which the heated glass sheets are delivered to the processing station 14. Suitable doors can be provided at both the entrance and exit slots 20 and 22 and are opened to allow the glass sheets to move through the slots and are closed the rest of the time to reduce heat loss from the heating chamber 18 to the environment. Any suitable type of heater can be utilized to provide the heating such as the upper and lower heaters 24 and 26 illustrated.

Figure 2:
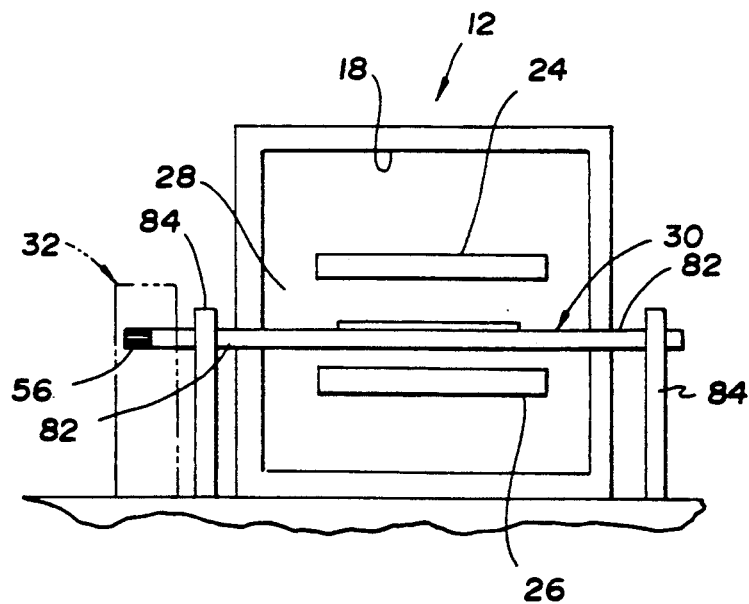
FIG. 2 is a cross-sectional view through the furnace and its roller conveyor and drive mechanism taken along the direction of line 2—2 in FIG. 1.

As shown in both FIGS. 1 and 2, the furnace 12 also includes a roller conveyor 28 within the housing 16 and including horizontally extending rolls 30 for conveying a flat glass sheet G to be heated.

As best illustrated in FIG. 3, a drive mechanism 32 of the furnace includes a primary drive loop 34 and a pair of primary drive wheels 36 that receive the primary drive loop which extends therebetween with substantially straight driving and return reaches 38 and 40, respectively. The primary drive loop 34 as shown in FIG. 4 has internal teeth 42 and the primary drive wheels 36 shown in FIG. 3 have external teeth 44 that mesh with the internal teeth of the primary drive loop. The primary drive wheels 36 are driven alternately in opposite directions as shown by arrows 46 and thereby alternately drive the primary drive loop 34 along its driving and return reaches 38 and 40 in opposite directions as shown by arrows 48.

Figure 6:
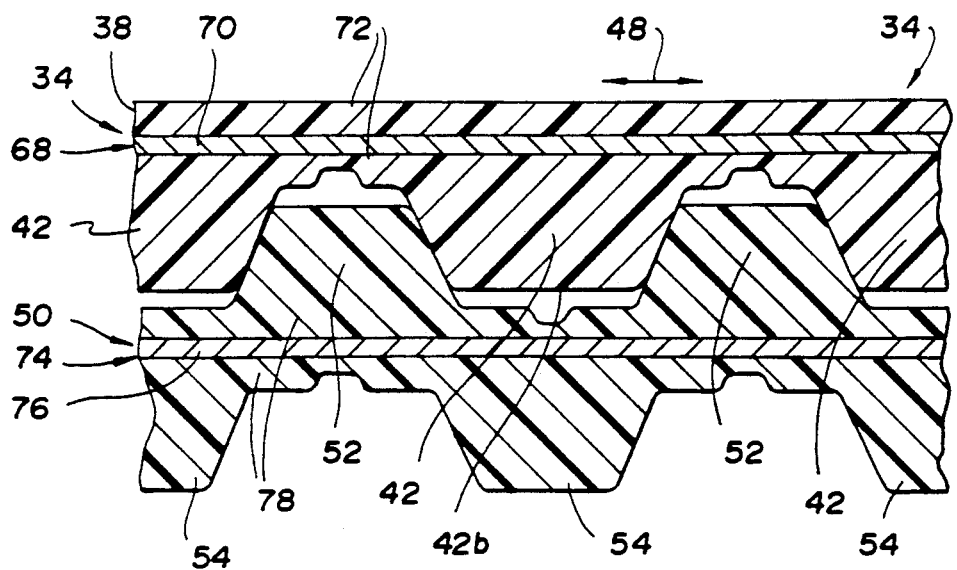
FIG. 6 is a partial view illustrating the way in which the primary and secondary drive loops mesh with each other during operation of the drive mechanism.

As illustrated by combined reference to FIGS. 3 and 4, the drive mechanism also includes a plurality of secondary drive loops 50 each of which has external and internal teeth 52 and 54, respectively, and each of which is associated with a pair of the conveyor rolls 30. Drive gears 56 are each secured to an associated conveyor roll 30 and have external teeth 58 that mesh with the internal teeth 54 of the associated secondary drive loop which has driving and return reaches 60 and 62, respectively, extending between the associated pair of gears. The external teeth 52 of each secondary drive loop 50 along the driving reach 60 thereof mesh with the internal teeth 42 of the primary drive loop 34 along the driving reach 38 of the primary drive loop to drive the conveyor rolls in opposite directions as the primary drive loop is driven in opposite directions by the drive wheels 36. This meshing of the internal teeth 42 of the primary drive loop 34 with the external teeth 52 of each secondary drive loop 50 is illustrated in FIG. 6 and is hereinafter more fully described. As shown in both FIGS. 3 and 4, a plurality of idler gears 64 are respectively associated with the secondary drive loops 50 and have external teeth 66 that mesh with the external teeth 54 along the return reaches 62 of the secondary drive loops to maintain tensioning that prevents backlash and provides uniform reversal of all of the conveyor rolls as the driving changes from one direction to the other. The driving of the conveyor rolls 30 by meshing teeth as disclosed also allows the high sides of the conveyor rolls between their ends to be angularly aligned with each other, by appropriate rotation of each conveyor rolls, which maintains the planarity throughout the conveyance.

As illustrated in FIG. 6, the primary drive loop 34 is constructed as a belt 68 having a metal core 70 and an elastomeric covering 72 that forms the internal teeth 42 of the primary drive loop. As illustrated, each secondary drive loop 50 is also constructed as a belt 74 having a metal core 76 and an elastomeric covering 78 that forms the external and internal teeth 52 and 54 of the secondary drive loop.

As shown in FIGS. 4, 5 and 6, the internal teeth 42 of the primary drive loop 34 and the external teeth 52 of the secondary drive loop 50 as well as the internal teeth 54 of the secondary drive loop are constructed to include: flat faces 42a, 52a and 54a that are inclined; top lands 42b, 52b and 54b that extend between the inclined faces at the tips of the teeth; and bottom lands 42c, 52c and 54c that extend between the roots of the teeth. Furthermore, as illustrated best in FIG. 6, the teeth have sizes such that the top lands 42b of the internal teeth 42 of the primary drive loop 34 are spaced from the bottom lands 52c of the external teeth 52 of the secondary drive loops 50 and such that the top lands 52b of the external teeth 52 of the secondary drive loops 50 are spaced from the bottom lands 42c of the internal teeth 42 of the primary drive loop 34.

Figure 7:
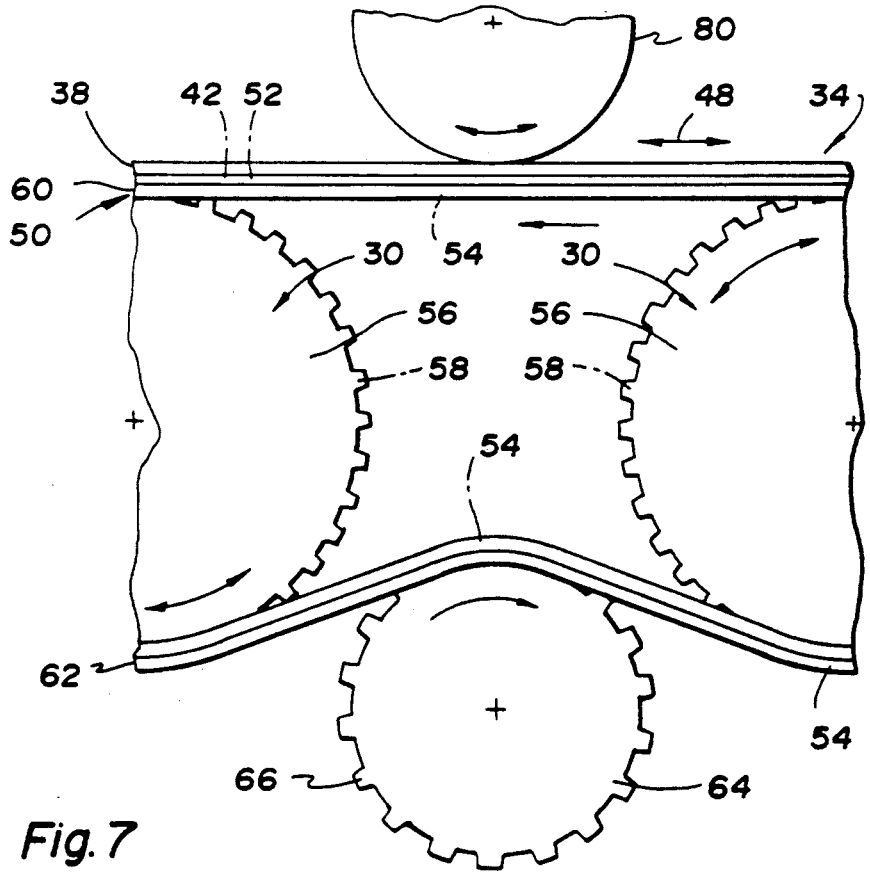
FIG. 7 is a schematic view that illustrates the manner in which an idler gear and an engagement roll are associated with each secondary drive loop.

As illustrated by combined reference to FIGS. 3 and 7, a plurality of engagement rollers 80 are respectively associated with the secondary drive loops 50 and are rotatably supported above the primary drive loop 34 adjacent its driving reach 38 in rolling engagement therewith to maintain the engagement between the inclined faces 42a and 52a of the internal teeth 42 of the primary drive loop and the external teeth 52 of the secondary drive loops during the driving in each direction and upon changing from each direction to the other direction without any backlash. Best results occur when the driving reach 60 of each secondary drive loop 50 and the associated portion of the driving reach 38 of the primary drive loop 38 are flexed downwardly a very slight extent such as about 1 millimeter, between the two adjacent conveyor rolls 30 so as to thereby ensure the engagement between the inclined faces of the teeth throughout the operation of the mechanism both upon driving in each direction and upon reversing from one direction to the other direction. The engagement rollers 80 can also be biased by associated springs to maintain the engaged condition of the inclined faces of the teeth.

As illustrated in FIG. 2, the conveyor rolls 28 are preferably made of fused silica such as sinter bonding of fused silica particles during molding so as to have good resistance to thermal warpage. Each conveyor roll 30 has opposite ends 82 that project outwardly from the heating chamber 18 through suitable openings in the furnace side wall where heat seals may be located. Bearings 84 rotatably support the opposite ends 82 of the conveyor rolls 30 outside of the furnace. The drive mechanism 32 drives the ends 82 of the conveyor rolls on one side of the furnace with the adjacent bearings 84 located between the furnace and the drive mechanism. This driving of the conveyor rolls 30 is performed through the gears 56 secured to the conveyor roll ends 32 in the manner previously described.

It should also be noted that while the drive mechanism 32 has been described in connection with an oscillating furnace conveyor for which it has particular advantages, the drive mechanism can also be used to provide driving in a single direction furnace conveyor.

While the best mode for carrying out the invention has been described in detail, those familiar with the art to which this invention relates will recognize various alternative designs and constructions for practicing the invention as defined by the following claims.

What is claimed is:

1. A furnace for heating flat glass sheets comprising: a housing defining a heating chamber; a roller conveyor located within the housing and including horizontal rolls for conveying a flat glass sheet to be heated; and a drive mechanism including a primary drive loop and a pair of primary drive wheels that receive the primary drive loop which extends therebetween with substantially straight driving and return reaches, said primary drive loop having internal teeth and said pair of primary drive wheels having external teeth that mesh with the internal teeth of the primary drive loop, said primary drive wheels alternately driving the primary drive loop in opposite directions, said drive mechanism also including a plurality of secondary drive loops each of which has external and internal teeth and each of which is associated with a pair of conveyor rolls, drive gears each of which is secured to an associated conveyor roll, each drive gear including external teeth that mesh with the internal teeth of the associated secondary drive loop which has driving and return reaches extending therebetween, the external teeth of each secondary drive loop along the driving reach thereof meshing with the internal teeth of the primary drive loop along the driving reach of the primary drive loop to drive the conveyor rolls in opposite directions as the primary drive loop is driven in opposite directions, and a plurality of idler gears respectively associated with the secondary drive loops and having external teeth that mesh with the external teeth along the return reaches of the secondary drive loops to maintain tensioning that prevents backlash and provides uniform reversal of all of the conveyor rolls as the driving changes from one direction to the other as well as allowing the conveyor rolls to be positioned with their high sides aligned so as to maintain planarity during the conveyance.

2. A furnace for heating flat glass sheets as in claim 1 wherein the primary drive loop comprises a belt having a metal core and an elastomeric covering that forms the internal teeth of the primary drive loop.

3. A furnace for heating flat glass sheets as in claim 1 wherein each secondary drive loop comprises a belt having a metal core and an elastomeric covering that forms the external and internal teeth of the secondary drive loop.

4. A furnace for heating flat glass sheets as in claim 1 wherein the primary drive loop is a belt having a metal core and an elastomeric covering that forms the internal teeth of the primary drive loop, and wherein each secondary drive loop is a belt having an elastomeric covering that forms the external and internal teeth of the secondary drive loop.

5. A furnace for heating flat glass sheets as in claim 1 wherein the drive mechanism has the teeth of the primary drive loop and the secondary loop constructed to include flat faces that are inclined, said teeth also including top and bottom lands extending between the inclined faces of the teeth, the teeth being of sizes such that the top lands of the teeth of each drive loop are spaced from the bottom lands of the teeth of the other drive loop, and a plurality of engagement rollers respectively associated with the secondary drive loops to maintain the engagement between the inclined faces of the teeth of the primary and secondary drive loops during the driving in each direction and upon changing from each direction to the other direction without any backlash.

6. A furnace for heating flat glass sheets as in claim 1 wherein the conveyor rolls are made from fused silica and have opposite ends that project outwardly from the heating chamber through the furnace, bearings that rotatably support the opposite ends of the conveyor rolls outside the furnace, and the drive mechanism driving the ends of the conveyor rolls on one side of the furnace with the adjacent bearings located between the furnace and the drive mechanism.

7. A furnace for heating flat glass sheets comprising: a housing defining a heating chamber; a roller conveyor located within the housing and including horizontal rolls of fused silica for conveying a flat glass sheet to be heated, said conveyor rolls having ends that project outwardly from the heating chamber through the furnace, and bearings that rotatably support the conveyor roll ends outside of the furnace; and a drive mechanism including a primary drive loop and a pair of primary drive wheels that receive the primary drive loop which extends therebetween with substantially straight driving and return reaches, said primary drive loop having internal teeth and said pair of primary drive wheels having external teeth that mesh with the internal teeth of the primary drive loop, said primary drive wheels alternately driving the primary drive loop in opposite directions, the primary drive loop being a belt having a metal core and an elastomeric covering that provides the internal teeth thereof, said drive mechanism also including a plurality of secondary drive loops each of which has external and internal teeth and each of which is associated with a pair of conveyor rolls, drive gears each of which is secured to an associated conveyor roll, each drive gear including external teeth that mesh with the internal teeth of the associated secondary drive loop which has driving and return reaches extending therebetween, the external teeth of each secondary drive loop along the driving reach thereof meshing with the internal teeth of the primary drive loop along the driving reach of the primary drive loop to drive the conveyor rolls in opposite directions as the primary drive loop is driven in opposite directions, and a plurality of idler gears respectively associated with the secondary drive loops and having external teeth that mesh with the external teeth along the return reaches of the secondary drive loops to maintain tensioning that prevents backlash and provides uniform reversal of all of the conveyor rolls as the driving changes from one direction to the other as well as allowing the conveyor rolls to be positioned with their high sides aligned so as to maintain planarity during the conveyance.

8. A furnace for heating flat glass sheets comprising: a housing defining a heating chamber;

a roller conveyor located within the housing and including horizontal rolls of fused silica for conveying a flat glass sheet to be heated, said conveyor rolls having ends that project outwardly from the heating chamber through the furnace, and bearings that rotatably support the conveyor roll ends outside of the furnace; and a drive mechanism including a primary drive loop and a pair of primary drive wheels that receive the primary drive loop which extends therebetween with substantially straight driving and return reaches, said primary drive loop having internal teeth and said pair of primary drive wheels having external teeth that mesh with the internal teeth of the primary drive loop, said primary drive wheels alternately driving the primary drive loop in opposite directions, the primary drive loop being a belt having a metal core and an elastomeric covering that provides the internal teeth thereof, said drive mechanism also including a plurality of secondary drive loops each of which has external and internal teeth and each of which is associated with a pair of conveyor rolls, drive gears each of which is secured to an associated conveyor roll, each drive gear including external teeth that mesh with the internal teeth of the associated secondary drive loop which has driving and return reaches extending therebetween, the external teeth of each secondary drive loop along the driving reach thereof meshing with the internal teeth of the primary drive loop along the driving reach of the primary drive loop to drive the conveyor rolls in opposite directions as the primary drive loop is driven in opposite directions, a plurality of idler gears respectively associated with the secondary drive loops and having external teeth that mesh with the external teeth along the return reaches of the secondary drive loops to maintain tensioning, and a plurality of engagement rolls respectively associated with the secondary drive loops to maintain engagement between the teeth of the primary and secondary drive loops during the driving in each direction and upon changing from one direction to the other direction without any backlash while providing uniform reversal of all of the conveyor rolls as well as allowing the conveyor rolls to be positioned with their high sides aligned so as to maintain planarity during the conveyance.

9. A furnace for heating flat glass sheets comprising:

a housing defining a heating chamber;

a roller conveyor located within the housing and including horizontal rolls for conveying a flat glass sheet to be heated; and a drive mechanism including a primary drive loop and a pair of primary drive wheels that receive the primary drive loop which extends therebetween with substantially straight driving and return reaches, said primary drive loop having internal teeth and said pair of primary drive wheels having external teeth that mesh with the internal teeth of the primary drive loop, said primary drive wheels driving the primary drive loop, said drive mechanism also including a plurality of secondary drive loops each of which has external and internal teeth and each of which is associated with a pair of conveyor rolls, drive gears each of which is secured to an associated conveyor roll, each drive gear including external teeth that mesh with the internal teeth of the associated secondary drive loop which has driving and return reaches extending therebetween, the external teeth of each secondary drive loop along the driving reach thereof meshing with the internal teeth of the primary drive loop along the driving reach of the primary drive loop to drive the conveyor rolls as the primary drive loop is driven, and a plurality of idler gears respectively associated with the secondary drive loops and having external teeth that mesh with the external teeth along the return reaches of the secondary drive loops to maintain tensioning that maintains the teeth in meshing engagement during the driving.

* * * * *